(12) United States Patent
Pan et al.

(10) Patent No.: US 9,996,798 B2
(45) Date of Patent: Jun. 12, 2018

(54) TRAFFIC PREDICTION USING REAL-WORLD TRANSPORTATION DATA

(71) Applicant: University of Southern California, Los Angeles, CA (US)

(72) Inventors: Bei Pan, Los Angeles, CA (US); Ugur Demiryurek, Redondo Beach, CA (US); Cyrus Shahabi, Irvine, CA (US)

(73) Assignee: University of Southern California, Los Angeles, CA (US)

( * ) Notice: Subject to any disclaimer, the term of this patent is extended or adjusted under 35 U.S.C. 154(b) by 98 days.

(21) Appl. No.: 15/065,756

(22) Filed: Mar. 9, 2016

(65) Prior Publication Data

US 2016/0189044 A1 Jun. 30, 2016

Related U.S. Application Data

(62) Division of application No. 14/060,360, filed on Oct. 22, 2013, now Pat. No. 9,286,793.

(Continued)

(51) Int. Cl.
*G06N 5/04* (2006.01)
*G08G 1/00* (2006.01)
*G08G 1/01* (2006.01)

(52) U.S. Cl.
CPC ............ *G06N 5/04* (2013.01); *G08G 1/00* (2013.01); *G08G 1/0112* (2013.01); *G08G 1/0129* (2013.01); *G08G 1/0141* (2013.01)

(58) Field of Classification Search
None
See application file for complete search history.

(56) References Cited

U.S. PATENT DOCUMENTS 5,168,136 A * 12/1992 Thangavelu .......... B66B 1/2466
706/910
6,317,686 B1 * 11/2001 Ran ...................... G08G 1/0141
701/117

(Continued)

OTHER PUBLICATIONS

Nihan and Zhu, "Short-term Forecasts of Freeway Traffic Volumes and Lane Occupancies, Phase 1," Washington State Department of Transportation, Jun. 1993, 113 pages.

(Continued)

*Primary Examiner* — John Olszewski
*Assistant Examiner* — David P. Merlino
(74) *Attorney, Agent, or Firm* — Fish & Richardson P.C.

(57) ABSTRACT

Systems and techniques for enhancing accuracy of traffic prediction include a system of one or more computers operable to receive a request relating to traffic prediction, compare a first prediction error for a first (moving average) traffic prediction model with a second prediction error for a second (historical average) traffic prediction model, calculated using a historical data set selected from previously recorded traffic data in accordance with a day and time associated with the request, select use of the first model or the second model based on the comparison of prediction errors, and provide an output for use in traffic prediction, wherein the output comes from applying the first traffic prediction model when the first prediction error is less than the second prediction error, and the output comes from applying the second traffic prediction model when the first prediction error is not less than the second prediction error.

20 Claims, 11 Drawing Sheets

Related U.S. Application Data

(60) Provisional application No. 61/717,574, filed on Oct. 23, 2012.

(56) References Cited

U.S. PATENT DOCUMENTS

| | | | |
|---|---|---|---|
| 7,698,055 | B2 | 4/2010 | Horvitz et al. |
| 8,024,111 | B1 | 9/2011 | Meadows et al. |
| 2005/0021225 | A1* | 1/2005 | Kantarjiev ........... G08G 1/0129 701/119 |
| 2006/0058940 | A1 | 3/2006 | Kumagai et al. |
| 2007/0208492 | A1 | 9/2007 | Downs et al. |
| 2008/0046165 | A1* | 2/2008 | Downs ................. G08G 1/0104 701/117 |
| 2008/0071465 | A1 | 3/2008 | Chapman et al. |
| 2009/0204320 | A1 | 8/2009 | Shaffer et al. |
| 2011/0043377 | A1 | 2/2011 | McGrath et al. |
| 2011/0160988 | A1* | 6/2011 | Rogers ................. G08G 1/0104 701/119 |
| 2011/0161261 | A1* | 6/2011 | Wu ....................... G08G 1/0104 706/12 |
| 2011/0224893 | A1 | 9/2011 | Scofield et al. |
| 2013/0110392 | A1 | 5/2013 | Kosseifi et al. |

OTHER PUBLICATIONS

Akiva et al., "DynaMIT: a simulation-based system for traffic prediction," *Massachusetts Institute of Tech. Intell. Trans. Systems Prog.*, Feb. 1998, 12 pages.

Chong et al., "Traffic Accident Analysis Using Decision Trees and Neutral Networks," *IADIS International Conference on Applied Computing*, 2004, 2: 39-42.

Chung and Recker, "A Methodological Approach for Estimating Temporal and Spatial Extent of Delays Caused by Freeway Accidents," *IEEE Transactions on Intellegent Transportation Systems*, Apr. 3, 2012, 8 pages.

Clark, "Traffic Prediction Using Multivariate Nonparametric Regression," *J. of Trans. Eng.*, 2003 161-168.

Demiryurek et al., "Online Computation of Fastest Path in Time-Dependent Spatial Networks," *Advances in Spatial and Temporal Databases*, 2011, 92-111.

Gehrke and Wojtusiak, "Traffic Prediction for Agent Route Planning," *Computational Science*, 2008, 692-701.

Hall and Smith, "Practical Feature Subset Selection for Machine Learning," *Computer Science*, Feb. 1998, 181-191.

Ihler et al., "Adaptive Event Detection with Time-Varying Poisson Processes," *KDD '06*, 2006, 207-216.

Ishak and Alecsandru, "Optimizing Traffic Prediction Performance of Neural Networks under Various Topological, Input and Traffice Condition Settings," *Transportation Research record Journal*, Oct. 25, 2002, 23 pages.

Kwon et al, "The Components of Congestion: Delay from Incidents, Special Events, Lane Closures, Weather, Potential Ramp Metering Gain, and Excess Demand," 8th Annual Meeting Transportation Research Board, Jan. 2006, 18 pages.

Lee and Fambro, "Application of Subset Autoregressive Integrated Moving Average Model for Short-term Freeway Traffic Volume Forcasting," *Transportation Research Record*, Dec. 1, 1999, 3 pages.

Li and Porikli, "A Hidden Markov Model Framework for Traffic Event Detection Using Video Features," Mitsubishi Electric Research Laboratories, Inc., 2004, 7 pages.

Li et al., "Temporal Outlier Detection in Vehicle Traffic Data," 2009, *Data Engineering*, 1319-1322.

Lint et al., "State Space Neural Networks for Freeway Travel Time Prediction," *Artificial Neural Networks—ICANN 2002*, 2002, 1043-1048.

Lohr, "New ways to Exploit Raw Data May Bring Surge of Innovation, a Study Says," *The New York Times*, May 13, 2011, 3 pages http://wwwnytimes.com/2011/05/13/technology/13data.html.

Marshment et al., "Short-range Intercity Traffic Forecasting using Econometric Techniques," *ITE Journal*, 1996, 66: 37.

Miller and Gupta, "Mining Traffic Incidents to Forecast Impact," *UrbComp '12*, Aug. 12, 2012, 33-40.

Park et al., "Short-term Freeway Traffic Volume Forecasting using Radial Basis Function neural Network," Transportation Research Record, Issue No. 1651, Dec. 21, 1998, 39-47.

Pelham-Box and Jenkins, *Time Series Analysis, Forecasting and Control*, Holden-Day, Inc., 1990.

Schwarz, "Estimating the Dimension of a Model," The Annals of Statistics, Mar. 1978, 6(2): 461-464.

Stephanedes et al., "Improved Estimation of Traffic Flow for Real-Time Control (Discussion and Closure)," Transportation Research Record, Issue No. 795, Nov. 23, 1981, 28-39.

Tsai and Tai, "Traffic Monitoring and Event Analysis at Intersection Based on Integrated Multi-video and Petri Net Process," *Advances in Multimedia Monitoring*, 2011, 304-314.

Williams et al., "Urban Freeway Traffic Flow Prediction: Application of Seasonal Autoregressive Integrated Moving Average and Exponential Smoothing Models," Transportation Research Record, Issue No. 1644, Dec. 21, 1998. 132-141.

Xiao et al., "The Fuzzy-Neural Network Traffic Prediction Framework with Wavelet Decomposition," *Transportation Research Record: Journal of the Transportation Research Board*, Jan. 24, 2007, 16-20.

Yuan et al., "Driving with Knowledge from the Physical World," *KDD '11*, 2011, 316-324.

Yuan et al., "An Interactive-Voting Based Map Matching Algorithm,"*Mobile Data Management*, 2010, 43-52.

Zhang, "Recursive Prediction of Traffic Conditions with Neural Network Models," Nov. 15, 1998, 4 pages http://ascelibrary.org/doi/abs/10.1061/(ASCE)0733-947X(2000)126:6(472).

\* cited by examiner

200  Get $\lambda(\{v(j)\}, d, w)$
Output: $\lambda$
1: Let $S = \{V(\{v(j)\}, d, w)\}$
2: Let $Err_{ARIMA} = 0$; $Err_{HAM} = 0$
3: Initialize ARIMA model with training dataset $\{v(j)\}$
4: $v_{HAM}$ = Average($V\{d,w\}$);
5: for all $v_i \in S$ do
6:   $v_{ARIMA}$ = ARIMA($i$);
7:   $Err_{ARIMA} = Err_{ARIMA} + $ RMSE($v_i, v_{ARIMA}$);
8:   $Err_{HAM} = Err_{HAM} + $ RMSE($v_i, v_{HAM}$);
9: end for
10: $\lambda = Err_{ARIMA} / (Err_{ARIMA} + Err_{HAM})$
11: Return $\lambda$.
*Fig. 2*
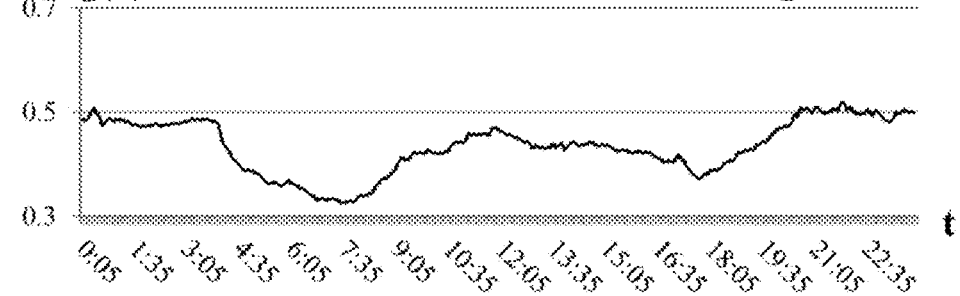
*Fig. 3A*
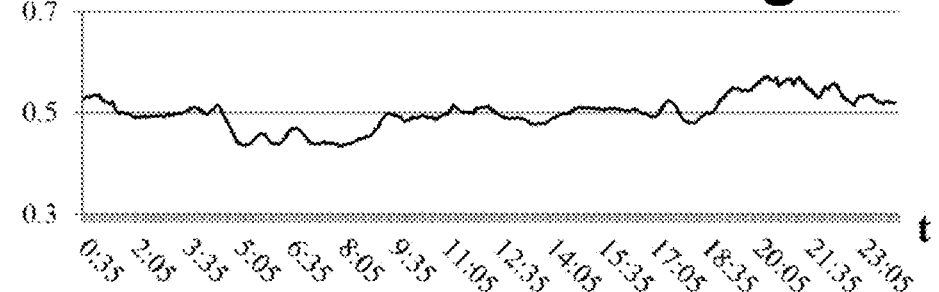
*Fig. 3B*

TRAFFIC PREDICTION USING REAL-WORLD TRANSPORTATION DATA

CROSS REFERENCE TO RELATED APPLICATIONS

This application is a divisional application of, and claims the benefit of priority from, U.S. application Ser. No. 14/060,360, entitled "Traffic Prediction Using Real-World Transportation Data", filed Oct. 22, 2013, and issuing as U.S. Pat. No. 9,286,793 on Mar. 15, 2016, which claims the benefit of priority from U.S. Provisional Application entitled "Utilizing Real-World Transportation Data for Accurate Traffic Prediction", filed Oct. 23, 2012, Application Ser. No. 61/717,574, the disclosure of which is incorporated by reference in its entirety.

STATEMENT AS TO FEDERALLY SPONSORED RESEARCH

This invention was made with government support under National Science Foundation (NSF) grant number IIS-1115153. The government has certain rights in the invention.

BACKGROUND

This specification relates to traffic prediction for road networks.

The two most important commodities of the 21st century are time and energy; traffic congestion wastes both. Several disciplines, such as in transportation science, civil engineering, policy planning, and operations research have studied the traffic congestion problem through mathematical models, simulation studies and field surveys. However, due to the recent sensor instrumentations of road networks in major cities as well as the vast availability of auxiliary commodity sensors from which traffic information can be derived, e.g., CCTV (closed-circuit television) cameras, GPS (global positioning system) devices, for the first time a large volume of real-time traffic data at very high spatial and temporal resolutions has become available. While this is a gold mine of data, the most popular utilization of this data is to simply visualize and utilize the current real-time traffic congestion on online maps, car navigation systems, sig-alerts, or mobile applications. However, the most useful application of this data is to predict the traffic ahead of you during the course of a commute. This predictive information can be either used by a driver directly to avoid potential gridlocks or consumed by a smart route-planning algorithm to ensure a driver picks the best route from the start. Using traffic information that avoids congestion can potentially save consumers substantial amounts of time and money.

SUMMARY

In the past, several statistics, machine learning and data mining approaches have been applied to traffic data for prediction purposes, such as auto-regression, neural net and smoothing techniques (see S. Lee et al., "Application of subset autoregressive integrated moving average model for short-term freeway traffic volume forecasting", J. van Lint et al., "Freeway travel time prediction with State-Space neural networks", and B. Williams et al., "Urban freeway traffic flow prediction: Application of seasonal autoregressive integrated moving average and exponential smoothing models"). However, in this paper, a very pragmatic approach is described to evaluate and then enhance these techniques by intensely studying a very large-scale and high-resolution spatiotemporal transportation data from the Los Angeles County road network. This dataset includes traffic flows recorded by under-pavement loop detectors as well as police reports on accidents and events. In some implementations, a system acquires these datasets in real time from various agencies such as Caltrans, City of Los Angeles Department of Transportation (LADOT), California Highway Patrol (CHP), Long Beach Transit (LBT), Foothill Transit (FHT) and LA Metro. In some implementations, a main source can include approximately 8000 traffic loop-detectors located on the highways and arterial streets of Los Angeles County (covering 3420 miles, cumulatively) collecting several main traffic parameters such as occupancy, volume, and speed at the rate of 1 reading per 30 secs. However, even though this paper focuses on the sensor data collected from loop detectors, the systems and techniques described can be applied to other data collection approaches. For example, GPS data between regions can be aggregate (see J. Yuan ete al., "Driving with knowledge from the physical world"), and the links between regions can be considered as sensors in some implementations.

Working with real-world data, we have identified certain characteristics of traffic data, such as temporal patterns of rush hours or the spatial impacts of accidents, which can be incorporated into a data-mining technique to make it much more accurate. For example, for generic time-series, the observations made in the immediate past are usually a good indication of the short-term future. However, for traffic time-series, this is not true at the edges of the rush hours. In that case, the historical observations (perhaps for that same day, time, and location) can be better predictors of the future. Hence, an auto-regression algorithm such as ARIMA (see G. Box et al., "Time-series analysis: Forecasting and control"), which by itself cannot capture sudden changes at the temporal boundaries of rush hours, can be enhanced by incorporating historical patterns.

While predicting the short-term future has many applications, for example in fixing the errors of sig-alerts during rush-hours, it is not useful for smart path-planning where sometimes we need to know the traffic of a road-segment ahead of us by 30 minutes in advance. Again, historical data can improve long-term predictions because most probably the traffic behavior in 30 minutes at the desired location is similar to (say) yesterday's traffic at the same time and location. In this case, again ARIMA alone cannot be as effective since it only looks at immediate past and not the right subset of the historical patterns.

Unfortunately, even an enhanced ARIMA cannot predict accidents. However, if we know, e.g., from police event streams, that there is an accident (say, 30 minutes) ahead of us, we may be able to predict its delays and account for it. Again, historical data can be used to identify similar accidents, i.e., with similar severity, similar location and during the similar time, so that we can use their impact on average speed changes and backlog to predict the behavior of the accident in front of us. For example, our study shows that an accident that may happen between 4:00 pm and 8:00 pm on a particular segment of Interstate 5 (1-5) can cause 5.5 miles of average backlog ahead of the accident location. On the other hand, if the same accident happens between 8:00 pm and midnight the backlog will be 2.5 miles.

The main challenge is how to properly incorporate all the knowledge from historical and real-time data into an appropriate time-series mining technique. This is exactly what has been accomplished in this paper by enhancing ARIMA. Our experimental results with real-world LA data show that our enhanced ARIMA can outperform ARIMA by 78% when there is no unexpected events, and over 91% in the presence of events. In addition, we compared our enhanced approach with other competitor techniques used for traffic prediction and showed the superiority of our approach.

Traditional prediction approaches are analyzed herein based on a real-world dataset, and their limitations are discovered at boundaries of rush hours, or in long term prediction. To overcome such limitations, we propose a hybrid approach that utilizes both historical traffic patterns and current traffic speed for prediction. We also propose feature selection model(s) to analyze the correlations between meta-attributes of traffic incidents (from event reports) and their impact areas (from traffic data). Later, we incorporate this model into the hybrid traffic prediction approach to predict traffic in the presence of incidents. Further, we evaluate our approaches with real-world traffic data and event reports collected from transportation agencies, to show remarkable improvement in terms of prediction accuracy as compared with traditional traffic prediction approaches, especially at the boundaries of rush hours and at the beginning of unexpected traffic events, and for long term prediction.

In general, an aspect of the subject matter described in this specification can be embodied in a method that includes the actions of: receiving a request relating to traffic prediction, the request having an associated day and an associated time; determining how much to apply each of a first traffic prediction model and a second traffic prediction model based on previously recorded traffic data corresponding to the associated day and the associated time, wherein the first traffic prediction model includes a moving average model that exhibits increased prediction accuracy as a prediction time horizon is reduced, and the second traffic prediction model includes a historical average model that exhibits similar prediction accuracy across multiple prediction time horizons; and applying the first and second traffic prediction models in accordance with the determining to generate an output for use in relation to traffic prediction. Other embodiments of this aspect include corresponding systems, apparatus, and computer program products.

For example a system can include a user interface device and one or more computers operable to interact with the user interface device, where the one or more computers include at least one processor and at least one memory device, and the one or more computers are configured and arranged to perform operations of the method(s). The one or more computers can include a server operable to interact with the user interface device through a data communication network, and the user interface device can be operable to interact with the server as a client. The user interface device can include a mobile phone. In addition, the one or more computers can include one personal computer, and the personal computer can include the user interface device.

These and other embodiments can optionally include one or more of the following features. The determining can include: calculating a first prediction error for the first traffic prediction model and a second prediction error for the second traffic prediction model; and selecting between use of the first traffic prediction model and the second traffic prediction model based on the first prediction error and the second prediction error. The calculating can be based on a time and time horizon associated with the request. Moreover, the determining can include identifying the corresponding traffic data by identifying a subset of previously recorded traffic data that exhibits similar traffic conditions on a specific day of week, month or season that matches the associated day for the request.

The method(s) can include: receiving information regarding an event that has one or more attributes that are correlated with reduction in traffic flow on one or more roads of a road network approaching the event; calculating an influenced speed change and an influenced time shift, for a sensor associated with the road network, based on the information regarding the event (e.g., including start time, location, direction, and severity of the event as compared with similar historical events); and using the influenced speed change and the influenced time shift in application of the first traffic prediction model. Calculating the influenced speed change and the influenced time shift can includes calculating based on attributes for the event including (i) start time, (ii) location, (iii) direction, (iv) event type, and (v) affected lanes.

The previously recorded traffic data can include data derived from mobile sensor data. The method(s) can include generating the derived data by performing operations including: calculating speeds for multiple mobile sensors from mobile sensor data with respect to connected road segments in a road network; and generating a speed for a road segment of the connected road segments by calculating an aggregation of all speeds calculated for mobile sensors passing the road segment at a given time. In addition, the mobile sensor data can be obtained from public transit vehicles.

According to another aspect of the subject matter described in this specification, a method of predicting traffic on a road network in view of an event having an identified time and an identified location in the road network, where the method includes the actions of: retrieving attributes from past events on the road network; selecting a subset of the attributes that are correlated with traffic parameters including delayed traffic speeds, affected backlogs of vehicles, and amounts of time needed to clear backlogs of vehicles; discovering corresponding values for the traffic parameters under all combinations of the selected attributes; matching current attributes for the event in the road network to previous event attributes using the corresponding values for the traffic parameters to identify a subset of the past events; and using the identified time, the identified location, and the subset of the past events to predict (i) a delayed traffic speed for the event, (ii) an affected backlog of vehicles on one or more roads approaching the event in the road network, and (iii) an amount of time needed for the affected backlog of vehicles to be cleared in the road network. Other embodiments of this aspect include corresponding systems, apparatus, and computer program products.

These and other embodiments can optionally include one or more of the following features. The selected attributes can include (i) start time, (ii) location, (iii) direction, (iv) event type, and (v) affected lanes. The past events can include accidents, vehicle breakdowns, scheduled or unscheduled road closures or construction, emergencies, and social events, including concert and sporting events. The method (s) can include predicting traffic on the road network using previously recorded traffic data including data derived from mobile sensor data, and the method(s) can include generating the derived data by performing operations including: calculating speeds for multiple mobile sensors from mobile sensor data (e.g., obtained from public transit vehicles) with respect to connected road segments in a road network; and generating a speed for a road segment of the connected road segments by calculating an aggregation of all speeds calculated for mobile sensors passing the road segment at a given time.

BRIEF DESCRIPTION OF THE DRAWINGS

FIG. 2 shows an example of a hybrid traffic prediction process.

FIGS. 3A and 3B show effects of prediction horizons over an average of a decision parameter for a hybrid forecasting model.

DETAILED DESCRIPTION

Figure 1A:
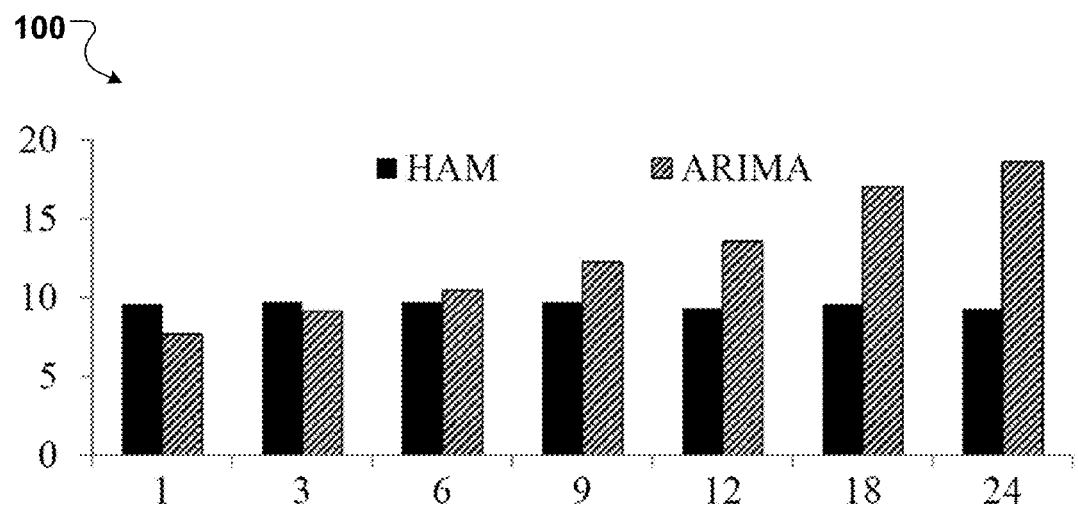
FIG. 1A shows an effect of prediction horizon when comparing auto-regressive integrated moving average and historical average models of traffic prediction.

The previous traffic prediction approaches can be grouped in two main categories: Simulation Models and Data Mining Techniques. Some traffic prediction techniques fall into the first category and use surveys and/or simulation models. For example, S. Clark, "Traffic prediction using multivariate nonparametric regression", proposes a non-parametric regression model to predict traffic based on the observed traffic data. In other cases, authors use microscopic models upon trajectories of individual vehicles to simulate overall traffic data and further conduct prediction (see J. D. Gehrke et al., "A natural induction approach to traffic prediction for autonomous agent-based vehicle route planning", and M. Ben-akiva et al., "DynaMIT: a simulation-based system for traffic prediction"). In another case, the traffic flow of a road segment is estimated by analyzing taxi trajectories. The major limitation of such studies is that they rely on sporadic observations and are often restricted to synthetic or simplified data for simulations.

Some traffic prediction techniques fall into the second category and use data mining techniques. The increase in the availability of real-time traffic has allowed researchers to develop and apply data mining techniques to forecast traffic based on real-world datasets. Since the early 1980s, univariate time-series models, mainly Box-Jenkins Auto-Regressive Integrated Moving Average (ARIMA) (see G. Box et al., "Time-series analysis: Forecasting and control") and Holt-Winters Exponential Smoothing (ES) models (see R. S. Marshment et al., "Short-range intercity traffic forecasting using econometric techniques", and B. Williams et al., "Urban freeway traffic flow prediction: Application of seasonal autoregressive integrated moving average and exponential smoothing models"), have been widely used in traffic prediction. In the last decade, Neural Network (NNet) models also has been extensively used in forecasting of various traffic parameters, including speed, travel time, and traffic flow. Nowadays, ARIMA, ES and NNet models are used as benchmarking methods for short-term traffic prediction. However, these approaches consider traffic flow as a simple time-series data and ignore phenomenons that particularly happen to traffic data. For example, for generic time-series, the observations made in the immediate past are usually a good indication of the short-term future. However, for traffic time-series, this is not true at the edges of the rush hours, due to sudden speed changes.

On the other had, traffic event analysis techniques have also been developed. The effect of events on traffic prediction has been studied in the fields of data mining and transportation engineering. Many of these studies focused on realtime event/outlier detection using probabilistic or rule-based approaches (see e.g., X. Li et al., "A hidden markov model framework for traffic event detection using video features", A. Ihler et al., "Adaptive event detection with time-varying poisson processes", and X. Li et al., "Temporal outlier detection in vehicle traffic data"). There are also several studies that mainly concern the cause of the events, aiming at how to design the network or re-direct the traffic flows to avoid the delay of events (see e.g., M. M. Chong et al., "Traffic accident analysis using decision trees and neural networks", and C. Tsai et al., "Traffic monitoring and event analysis at intersection based on integrated multi-video and petri net process"). However, none of these studies incorporate events into traffic prediction techniques, and hence fail to provide realistic estimations in the presence of events.

The focus of the present application, on the other hand, is to integrate the impact of various events into forecasting models. As a point of comparison, the model proposed in J. Kwon et al., "Components of congestion: delay from incidents, special events, lane closures, weather, potential ramp metering gain, and excess demand" utilizes a nearest-neighbor technique to detect cumulative delays and impact regions caused by traffic incidents. The impact regions are defined with fixed thresholds. However, the impact of events on traffic congestion varies based on space and time. For example, the impact region of an accident occurring during rush hour is usually more severe. Similarly, an accident at an inter-state street has a different impact region than that of a surface street. In the present application, we consider such spatiotemporal characteristics of traffic events in training our models.

Problem Definition: consider a set of road segments comprising n traffic sensors (e.g., loop detectors). We assume that at given time interval t (e.g., every minute), each sensor provides a traffic data reading, e.g., speed v[t]. We formulate the speed prediction problem as follows:

Definition 1: given a set of observed speed readings $V=\{v_i(j), j=1, \ldots, n; j=1, \ldots, t\}$, where i and j denotes a sensor and continuous time increments, respectively.

The prediction problem is to find the set V={vi(j), j=t+1, t+2, . . . t+h} for each sensor i, where h denotes the prediction horizon. For example, h=1 refers to predicting the value of speed at t+1, where t represents the current time.

Definition 2: "short-term prediction" and "long-term prediction" refer to prediction of speed when h=1 and h>1, respectively.

Two techniques are now introduced as baseline approaches of a prediction model according to some implementations. These two techniques are Auto-Regressive Integrated Moving Average (ARIMA) and Historical Average Model (HAM). Implementations using other techniques are also possible.

The ARIMA model is a generalization of an autoregressive moving average model with an initial differencing step applied to remove the non-stationarity of the data. The model can be formulated as $$Y_{t+1} = \Sigma_{i=1}^{P} \alpha_i Y_{t-i-1} + \Sigma_{i=1}^{q} \beta_i \varepsilon_{t-i+1} \varepsilon_{t+1}$$

where {Yr} refers to a time-series data (e.g., the sequence of speed readings). In the autoregressive component of this model ($\Sigma_{i=1}^{P} \alpha_i Y_{t-i+1}$), a linear weighted combination of previous data is calculated, where p refers to the order of this model and $\alpha_i$ refers to the weight of (t−i+1)-th reading. In the second part ($\Sigma_{i-1}^{q} \beta_i \varepsilon_{t-i+1}$), the sum of weighted noise from the moving average model is calculated, where Σ denotes the noise, q refers to its order and $\beta_i$ represents the weight of (t−i+1)-th noise.

As shown in Equation (1), the predicted value mainly relies on the linear combination of the data that occurred before time t. This model can be directly used to predict the traffic speed data, when prediction horizon h=1. When h>1, we can iterate the prediction process h times by using the predicted value as the input to predict the next value.

In addition, our analysis on real-world traffic sensor data reveals that there is a strong correlation (both temporally and spatially) present among the measurements of the single and multiple traffic sensor(s) on road networks. For example, the traffic condition of a particular road segment on Monday at 8:30 am can be estimated based the average of last four sensor readings for the same road segment at 8:30 am in the past four Mondays. Therefore, we introduce Historical average model (HAM) that uses the average of previous readings for the same time and location to forecast the future data. We formulate HAM as follows:

$$v(t_{d,w} + h) = \frac{1}{|V(d, w)|} \sum_{s \in V(d,w)} v(s) \qquad (2)$$

where V (d, w) refers to the subset of past observations that happened at the same time d on the same day w. Specifically, d captures the daily effects (i.e., the traffic observations at the same time of the day are correlated), while w captures the weekly effects (i.e., the traffic observations at the same day of the week are correlated). For example, if the traffic data to be predicted is next Monday at 8:00 am, d refers to "8:00 am", and w=Mon. Thereby V (d, w) refers to the set of traffic data that happens on previous Mondays at 8:00 am. In fact, the selection of historical observations is also relevant with seasonal effects. For example, the historical observations on Mondays during winter is probably different with that on Mondays during summer. Here, we eliminate the seasonal effects by assuming there is no season rotations in our historical observations. Also, as shown in the formula, the function to select past observations and calculating the average are indifferent to the value of the prediction horizon h.

One can use either ARIMA or HAM for traffic prediction in road networks. Here, we explain the limitations of both techniques based on our observations derived from real-world traffic datasets. Towards that end we present two case studies using different prediction horizons and temporal scales (i.e., rush hour boundaries).

In a first case study, we look at the effect of prediction horizon (h). We would like to compare the prediction accuracy of ARIMA and HAM for different prediction horizons using real-world traffic data. Further details regarding the real-world dataset and experimental setup are provided below. Note that the aggregation level for this data set in this first case study is 5 minutes. Our intuition is that ARIMA relies on very recent traffic data, which are usually a good indication of the near future. On the other hand, HAM uses the average of historical data for prediction, and hence HAM is more accurate in long-term prediction and its accuracy is independent of the prediction horizon. Our hypothesis can be summarized as follows:

Hypothesis 1: The prediction horizon has no noticeable effect on the prediction accuracy of HAM. However, as the prediction horizon increases, the prediction accuracy of ARIMA decreases.

The result of comparison using real data is presented in FIG. 1A in a graph 100, which shows the average mean absolute percentage error of prediction (y-axis) with respect to prediction horizon (x-axis). As shown in FIG. 1A, ARIMA yields better prediction than that of HAM when h<6 (i.e., less than 30-min in advance prediction). However, as h increases to the values larger than 6, HAM starts to yield better prediction. This result not only verifies hypothesis 1, but also reveals that ARIMA is not ideal for long-term predictions (i.e., more than 30-min in advance prediction).

In a second case study, the effect of rush hour boundaries is considered. The intuition here is that the observations made in the immediate past are usually a good indication of the short-term future. Therefore ARIMA is excepted to yield accurate prediction in the short-term. However, the speed change at rush-hour boundaries is sudden and there is no indication (i.e., trend) of such change before it happens. In such cases, ARIMA cannot capture the speed changes at the very beginning, but adjusts itself shortly after it takes the changed speed into account. On the other hand, since rush hours happen at almost same time of that particular day, HAM can predict the sudden speed changes at the boundary of rush hours. Our intuition can be summarized with the following hypothesis:

Hypothesis 2: HAM can efficiently predict the sudden speed changes at the boundaries (i.e., beginning and end) of rush hours. On the other hand, ARIMA has a delayed reaction on the boundaries.

Figure 1B:
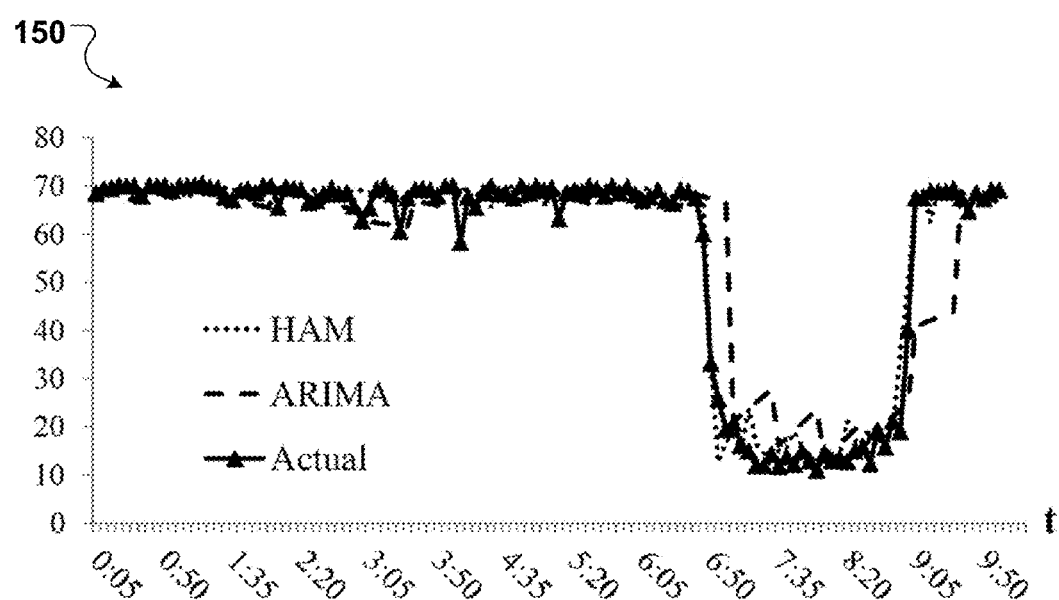
FIG. 1B shows an effect of rush-hour boundaries for auto-regressive integrated moving average and historical average models of traffic prediction.

In this second case study, we fix the prediction horizon (i.e., h=6) and compare the prediction accuracy of both approaches over time using real-world traffic speed data. The experimental results are depicted in FIG. 1B in a graph 150, which represents the actual speed data and predicted values from two models (HAM and ARIMA) for a specific sensor at different times of a particular weekday. As shown, in the morning rush hour around 6:50 am, HAM predicts the beginning of congestion with a very small error rate and ARIMA's prediction is shifted (with respect to actual speed) a few timestamps. Similarly, at the vanishing point of the rush hour congestions around 9:05 am, HAM still accurately predicts the after-congestion speed and ARIMA shifts a few timestamps. The results show that at the boundaries of rush hours, HAM yields higher prediction accuracy than that of ARIMA. Hence, the Hypothesis 2 is verified.

In view of this, a hybrid forecasting model can be constructed, such as an enhanced ARIMA prediction approach. In some implementations, a hybrid forecasting model named Historical ARIMA (H-ARIMA) selects in realtime between ARIMA or HAM based on their accuracy. In particular, as the traffic data streams arrive, the accuracy of ARIMA and HAM can be compared, and the one that yields low prediction error can be selected. As noted, ARIMA relies on recent traffic data, and hence in some circumstances (i.e., in the long-term when h≥6 and at the boundaries of rush hours) its prediction accuracy degrades significantly. On the other hand, HAM uses past observations to predict future traffic conditions. While HAM yields better prediction for long-term, it is not ideal for short-term predictions. Therefore, the main idea behind this hybrid approach is to distinguish the circumstances when a specific approach is better.

Towards that end, a decision-tree model can be trained that selects between ARIMA and HAM to forecast the speed at individual time stamps. In this model, the decision parameter and threshold are denoted as $\lambda_1$ and $\phi$, respectively. For each time stamp t, we choose between ARIMA and HAM based on the trained value of $\lambda_1$. If $\lambda_1 \le \phi$, we choose ARIMA, otherwise, we choose HAM. The value of $\lambda_1$ is calculated based on the rate of overall prediction error between HAM and ARIMA at t. The detailed approach is described in Algorithm 200 in FIG. 2, given the entire training dataset $\{v(j)\}$ (j=1 . . . t), together with the value of d and w.

In Line 1 of Algorithm 200, we initialize dataset S with all the historical data observed on day w, at time d. For example, if w=Mon and d=8:00 am, the set of S refers to all the traffic speed readings on Mondays at 8:00 am within the training dataset. In Lines 4-9, we utilize ARIMA and HAM to predict speed reading $v_i$ in S and compute their prediction error. In Line 10, is calculated as the ratio of the prediction error from ARIMA versus the sum of prediction errors from two approaches. Based on the calculation strategy of 2 in Algorithm 200, we observe that if $\lambda$<0.5, the total prediction error from ARIMA is less than that of HAM, which means ARIMA is better for this particular time stamp (i.e., time d on day w). Otherwise, HAM is better. Thereby, we set threshold $\phi$ as 0.5.

To further explain the robustness of H-ARIMA, we present the training results for $\lambda$ in the following two main cases. First, we study the effect of d on $\lambda$. FIGS. 3A and 3B show in charts 300 and 340 the effect of d with respect to the average 2 from all sensors for two different prediction horizons: h=1 (5 minutes in advance prediction) and h=6 (30 minutes in advance prediction). Here, the day parameter w is fixed as Wed. FIG. 3A indicates that in short-term prediction (i.e., h=1), the ARIMA yields better performance, because most average $\lambda$ values are less than 0.5. FIG. 3B shows that when h=6, there are more time instances with $\lambda$>0:5. This indicates that HAM starts to provide better prediction accuracy in the long term (Hypothesis 1). In addition, both charts 300 and 340 in FIGS. 3A and 3B show that during the morning and afternoon rush hours (i.e., 6:00 am to 9:00 am, 4:00 pm to 7:00 pm), the accuracy of HAM is not as good as compared to non-rush hours, reflecting that the average 2 declines during the rush-hour interval. One possible explanation is that during rush hours, the impact of the unexpected events (e.g., accident) is more significant than that of non-rush hours. Since the effects of traffic accidents are offset by averaging the entire history, HAM cannot capture such effects. We will address this problem in further detail below.

Figure 4A:
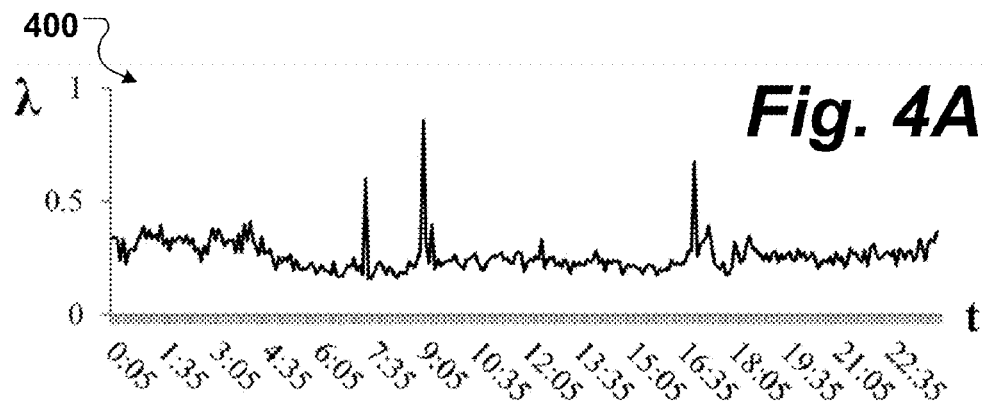
FIG. 4A shows an example of the behavior of the decision parameter over time.

Second, based on the Hypothesis 2, we examine behavior of 2 at the boundaries of rush hours, thereby focusing on the values of $\lambda$ for a particular sensor. In FIG. 4A, we plot 400 individual $\lambda$ value for a single sensor over all daily time stamps (d). To analyze the behavior of $\lambda$ over time, the historical average speed sequence is also plotted 450 in FIG. 4B. Here, the prediction horizon is fixed to h=1, and weekly parameter w=Wed.

Figure 4B:
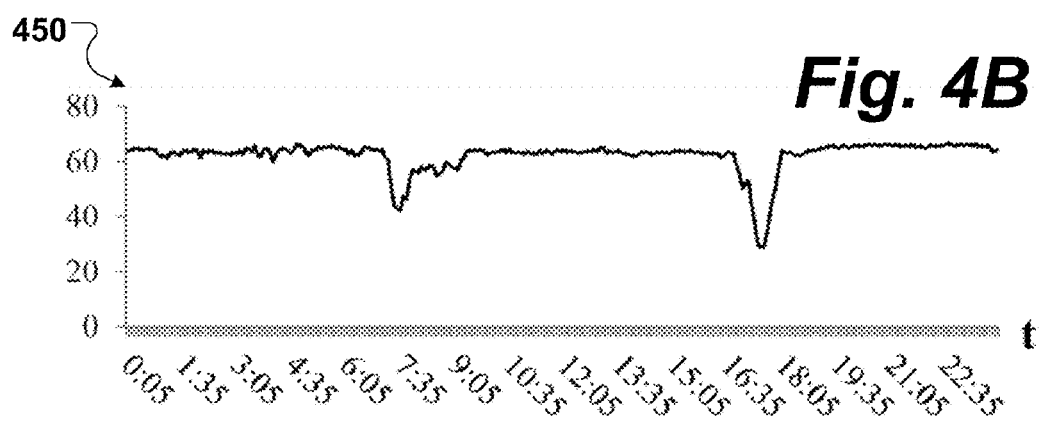
FIG. 4B shows an example of historical average speed (in miles per hour) to reveal effects of rush-hour boundaries over the decision parameter.

In FIG. 4A, there are three time instances where $\lambda$>0.5 (i.e., 6:35 am, 8:55 am and 4:35 pm). As shown in FIG. 4B, those three time instances are exactly at the boundaries of rush hours. As indicated, at beginning and ending of the rush hours, HAM model outperforms ARIMA, even though the prediction horizon is only 1.

In view of the points made above, the hybrid model can incorporate the impact of events in order to improve the prediction accuracy in the presence of events, such as traffic accidents. Traffic events include non-recurring incidents (e.g., accident, vehicle breakdown, and unscheduled road construction) which result in traffic congestion or disruption. In addition, we can consider social events such as a music concert at LA Live or Lakers basketball game at Staples Center. In any case, the effects of such events on traffic congestion in road networks can be taken into consideration. For example, event information can be incorporated in to H-ARIMA to enhance the prediction accuracy of the model. Towards this end, historical event reports and the associated traffic speed nearby at the time of the events can be exploited to model the correlation between event attributes and traffic congestion. Note that even though the model is built offline by using the past data, the model can be used online for better traffic prediction. That is, in real-time using the current event reports as input, the event's attributes can be matched to find similar events that happened in the past to predict speed delays and backlogs, caused by the current event. These delay predictions can have improved precision and provide quantitative measures of the current event, such as a prediction of a precise number of minutes (e.g., 7 minutes) of delay as opposed to a general range of duration for the event (e.g., 30 minute or less versus more than 30 minutes).

Figure 5:
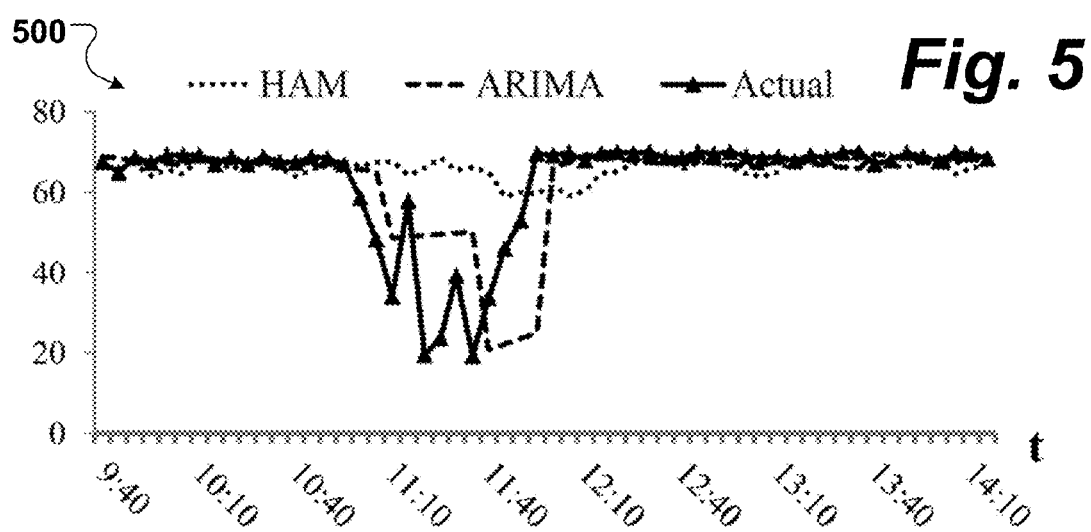
FIG. 5 shows an example of speed predictions from two techniques for a traffic accident as compared with the actual speed.

As discussed above, HAM can hardly react to unexpected traffic events as it eliminates the influence of events by averaging historical observations. ARIMA, due to its delayed reaction, is not an ideal method to use in the case of events which cause sudden changes in the time-series data. To illustrate the prediction accuracy of ARIMA and HAM in the presence of an event, consider FIG. 5, which shows the speed prediction of both techniques for a traffic accident that happened on freeway CA-91 at 10:53 am Dec. 5, 2011 with prediction horizon h=6. As shown, the prediction accuracy of both techniques are significantly low as compared with the actual speed. Hence, we discuss our Event Impact Area (EIA) model, which addresses the traffic prediction problem in the presence of events.

With the EIA, approach event data is used as an input to the algorithm, and this data can include but is not limited to the following meta-data: 1) event date, 2) event start-time, 3) event location (i.e., latitude, longitude), 4) event type (e.g., traffic collision, road construction), 5) type of vehicles involved if incident is an accident, and 6) number of affected lanes. We note that these information are included in event data streams that can be collected in a data center (see further details below). We also introduce a parameter, namely impact post-mile, to represent the spatial span of an event.

Figure 6:
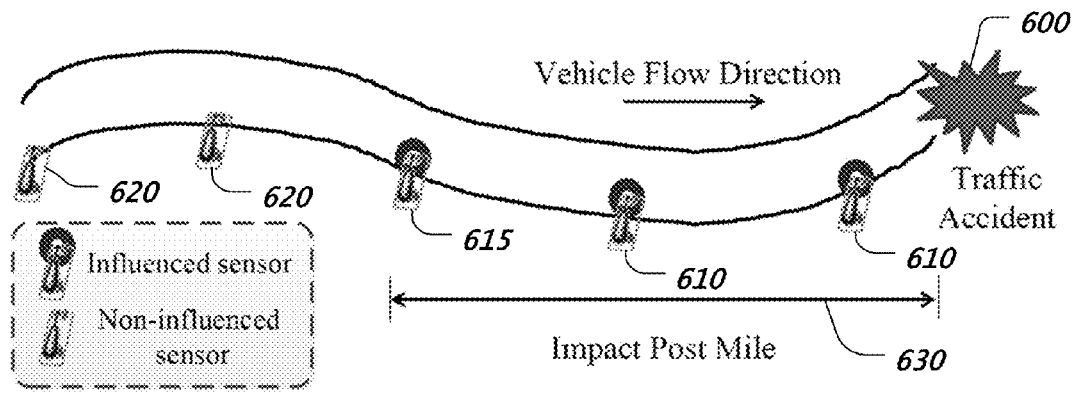
FIG. 6 shows a definition of impact post-mile.

Definition 3: Impact post-mile 630 is the distance between the location of an event 600 and its last influenced sensor 615 in the opposite direction of vehicle flow, as shown in FIG. 6.

The influenced sensors 610, 615 are the sensors whose speed reading show an anomalous decline compared with the historical average speed, whereas the non-influenced sensors 620 do not. In some implementations, the anomalous decline can be detected using the traffic event detection algorithm proposed in X. Li et al., "Temporal outlier detection in vehicle traffic data". To find such sensors, we use the speed readings of the sensors ahead of the event location.

Based on our analysis of real-world data, we observe that impact post-mile 630 varies across events with different attributes. Let us consider one of the attributes "start time" as an example. The impact post-mile of events that happen during day-time may be large compared with events happening at midnight, due to higher traffic flow during the day-time. The key to investigating the correlation between event attributes and impact post-mile is to decide which attributes are correlated with impact post-mile. It is likely that some event attributes are irrelevant or redundant for inferring impact post-mile 630. In order to identify the most correlated subset of event attributes, we can first normalize the event attributes as features and impact post-mile as numerical classes, and then apply the Correlation based Feature Selection (CFS) algorithm described in M. A. Hall et al., "Practical feature subset selection for machine learning" on top of this normalized data to select correlated features. We observe that the following event attributes are most correlated with impact post-mile: {Start time, Location, Direction, Type, Affected Lanes}.

We use the selected attributes to classify the impact post-mile 630, and utilize the average impact post-mile to represent the impact of an event. Table I shows some selected classification results where the impact post-mile under different start-time is aggregated into four hour intervals denoted as $S_{start-hour,end-hour}$ and "N/A" means that there is no such event happening with the attributes specified in our experimental dataset. When the number of affected lanes equals zero, this indicates that no lanes are blocked as the involved vehicles are moved to the shoulder of the road after the accident. The dataset used to train this model includes the events that happen on weekdays, when rush-hour is considered as 6:00 am to 9:00 am and 4:00 pm to 7:00 pm.

TABLE I

AVERAGE IMPACT POST-MILE ON EVENT META-ATTRIBUTES

| Location | D | $S_{0.4}$ | $S_{4.8}$ | $S_{8.12}$ | $S_{12.16}$ | $S_{16.20}$ | $S_{20.24}$ |
|---|---|---|---|---|---|---|---|
| (a) Traffic collision event, affected lanes = 0 ||||||||
| I-405 | N | 2.07 | 2.93 | 3.68 | 2.92 | 3.33 | 1.51 |
| I-405 | S | 0.14 | 3.37 | 2.61 | 3.63 | 4.37 | 2.03 |
| I-5 | N | 0.10 | 3.32 | 4.12 | 4.45 | 5.51 | 2.56 |
| I-5 | S | 1.17 | 3.66 | 3.41 | 2.43 | 3.73 | 1.34 |
| (b) Traffic collision event, affected lanes = 1 ||||||||
| I-405 | N | N/A | N/A | 4.74 | 3.57 | 3.52 | 0.46 |
| I-405 | S | N/A | N/A | N/A | N/A | 4.78 | 1.75 |
| I-5 | N | N/A | N/A | 2.02 | N/A | 6.11 | N/A |
| I-5 | S | 0.10 | N/A | N/A | N/A | N/A | N/A |
| (c) Road construction event, affected lanes = 1 ||||||||
| I-405 | N | 0.96 | N/A | 9.35 | 5.02 | N/A | 1.25 |
| I-405 | S | 1.73 | N/A | N/A | N/A | N/A | 0.19 |
| I-5 | N | N/A | N/A | 4.70 | 5.80 | 5.70 | 6.50 |
| I-5 | S | N/A | N/A | N/A | N/A | N/A | N/A |

From the results shown in Table I, we make the following observations. First, from Table 1(a), we observe that for the events happening during rush hours, the impact post-mile is larger than that of non-rush hours. This is expected because when an accident happens during rush hours on a high occupancy road, the impact of that event is more severe than on roads without traffic. Second, comparing Table 1(a) and 1(b), we infer that for the events happening at similar time, same location, the impact post-mile is generally larger when the number of affected lanes is more. Obviously, since the affected number of lanes reflects the number of lanes which are blocked by the events, the more lanes blocked, the slower the traffic flow. However, for accidents that occur at midnight, since the traffic is free-flow at that time, the higher number of affected lanes does not necessarily indicate longer impact post-mile. Third, in Table 1(c), we observe that for the road construction events, if they happen at day time, especially at rush hours, their impact on traffic is severe, sometimes exceptionally larger than that of traffic collisions happening at the same time. On the other hand, if they happen at night, their impact is not that significant.

In addition to impact post-mile, the speed change (speed-impact) caused by events is also very important for traffic prediction. To estimate the speed-impact, we introduce two factors to assist in event impact prediction: influenced speed change ($\Delta v$) and influenced time shift ($\Delta t$). We estimate $\Delta v$ based on the correlated attributes (similar to impact post-mile).

Definition 4: For sensor i, its influence speed change $\Delta v_i$ for event e is defined as the average speed changes for all events that share the same correlated attributes (i.e., Start-time, Location, Direction, Type and Affected Lanes) with e, and affected sensor i in the past.

Once we find the influenced speed change, the next step is to determine the exact time stamps we need to apply the change on sensors. When an event occurs, the sensors located at different locations might be influenced at different time stamps. Therefore, we define the concept of influenced time shift ($\Delta t$) to estimate the period of time that a sensor will be affected by an event.

Definition 5: For sensor i, its influenced time shift ($\Delta t_i$) for event e is defined as the distance between the sensor i and event e divided by the average traffic speed between them, which can be represented as follows:

$$\Delta t_i(e) = \frac{dist(i, e)}{ave(\{v_j\})} \text{ where } p(i) \leq p(j) \leq p(e) \qquad (3)$$

where p(i) refers to the post-mile of sensor i. The set of $\{v_j\}$ refers to all the speed readings presented at the sensors located between sensor i and event e. Below we summarize a procedure to predict traffic in case of events.

1) When an event e occurs at time t, all the relevant event features (i.e., {Start-time, Location, Direction, Type, Affected Lanes}) are incorporated in the EIA model to determine the impact post-mile of e.

2) Using the impact post-mile and the location of e, the set of all influenced sensors are identified as set $\{s_i\}$.

3) For each sensor $s_i$, during $[t+t_i(e), t+\Delta t_i(e)+h]$, the predicted value is calculated as $(v_i(t)-\Delta v_i)$, where h is the prediction horizon.

4) After time $t+\Delta t_i(e)+h$, ARIMA is used to predict the rest until the event e is cleared.

Using the systems and techniques described above, various experiments were conducted, the results of which are now described. The experimental setup included a traffic dataset, baseline approaches, and fitness measurements. Other implementations are also possible.

Traffic Dataset: In our research center, we maintain a very large-scale and high resolution (both spatial and temporal) traffic loop detector dataset collected from entire LA County highways and arterial streets. We also collect and store traffic event data from City of Los Angeles Department of Transportation and California Highway Patrol. The detailed description of this dataset is shown in Table II.

TABLE II

DATASET DESCRIPTION

|  |  |  |
| --- | --- | --- |
|  | duration | Nov. 1st-Dec. 7$^{th}$, 2011 |
| Sensor Data | #of sensors | 2028 |
|  | sensor sampling rate | 1 reading per 30 secs |
|  | spatial span | 3420 miles |
|  | aggregation level | 5 mins per sensor |
| Event Data | # of events | 3255 |
|  | # of event attributes | 43 |

Baseline Approaches: We implemented ARIMA starting with stationary verification, followed by the iterations of 1 to 10 for Auto Regressive model and 1 to 10 for Moving Average model to reach the best combination under Bayesian information criteria, such as is described in G. Schwarz, "Estimating the dimension of a model". We used the trained model for one-step (h=1) forecasting. When h>1 (i.e., long-term forecasting), we iterate the prediction procedure for h times by using predicted value as previously observed value.

We implemented an Exponential Smoothing (ES) method as a special case of ARIMA model, with the order auto-regressive model set to zero, and the order moving average model set to 2. In addition, we implemented Neural Network (NNet) model as multilayer perceptron (MLP). The architecture of MLP is as follows: 10 neurons in the input layer, single hidden layer with 4 neurons and h output neuron, where h refers to the prediction horizon. For example, in one-step forecasting, there is 1 output neuron. The input neurons include $\{v(k), k=t-9, \ldots, t\}$, while the output neuron is $\{v(t+1) \ldots v(t+h)\}$, where t represents the current time. Tangent sigmoid function and linear transfer function are used for activation function in the hidden layer and output layer, respectively. This model is trained using back-propagation algorithm over the training dataset.

Fitness Measurements: We use mean absolute percent error (MAPE) and root mean square error (RMSE) to quantify the accuracy of traffic prediction.

$$MAPE = \left(\frac{1}{N}\sum_{i=1}^{N}\frac{|y_i - \hat{y}_i|}{y_i}\right) \times 100 \quad (4)$$

$$RMSE = \sqrt{\frac{1}{N}\sum_{i=1}^{N}(y_i - \hat{y}_i)^2}$$

where $y_i$ and $\hat{y}_i$ represent actual and predicted traffic speed respectively, and n represents the number of predictions.

Figure 7A:
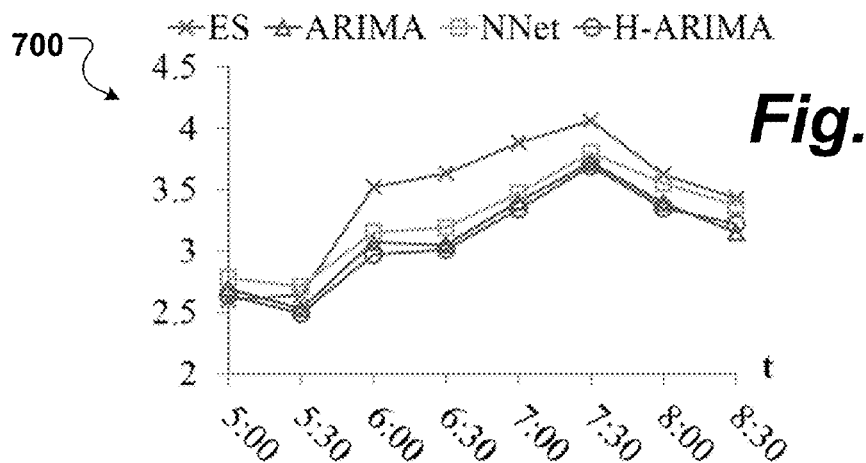
FIGS. 7A and 7B plot average one-step prediction accuracies over a weekday for a rush hour time interval and a non-rush hour time interval, respectively.
Figure 7B:
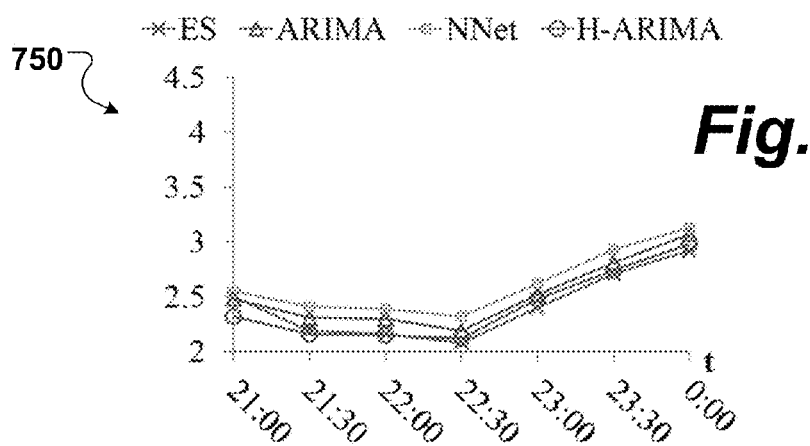
Figure 8A:
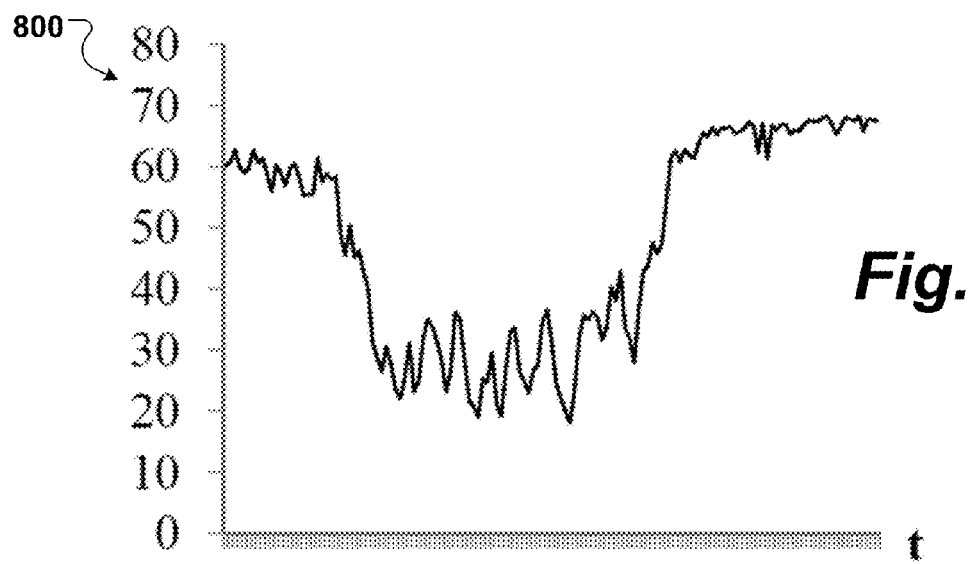
FIGS. 8A-9B show actual speed and mean absolute percent error of predictions on two different road segments of 1-5 and 1-10.
Figure 8B:
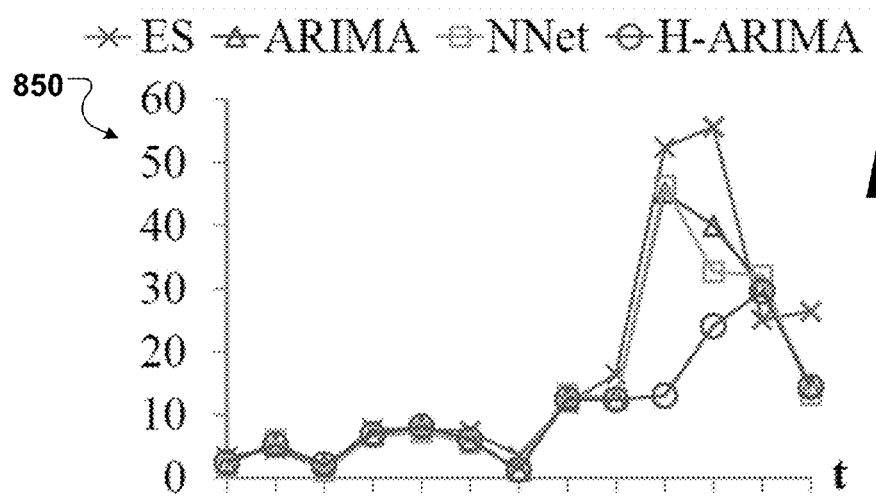

Initially, predictions are made without event information. In this set of experiments, we used the traffic dataset collected from November 1 to November 30 as the training set. The dataset from December 1 to December 7 is used as testing set. In a short-term prediction experiment, we evaluated the short-term prediction (i.e., h=1) accuracy of H-ARIMA with respect to baseline approaches. FIG. 7A plots 700 the average one-step prediction accuracy over all sensors on a weekday for a rush hour time interval. FIG. 7B plots 750, the average one-step prediction accuracy over all sensors on a weekday for a non-rush hour time interval. As shown, the accuracy of all prediction approaches during rush hour are lower than that of non-rush hours.

Though H-ARIMA outperforms baseline approaches in general, it does not show clear advantages over them according to the aggregated results (over 2028 sensors). However, as shown with the following experiment, H-ARIMA does have significantly better prediction accuracy than baseline approaches in the boundaries of rush hours. FIGS. 8A-9B show the actual speed and MAPE of the prediction on two different road segments of 1-5 and 1-10. In graph 800 in FIG. 8A, we observe that there is a sudden speed decrease around 14:00. Consequently, as shown in plot 850 in FIG. 8B at 14:15, we observe a significant increase in the prediction error of baseline approaches. This is because the baseline approaches cannot detect the sudden speed decrease in advance. On the other hand, H-ARIMA can estimate the beginning of congestion from historical pattern and yields better prediction by improving the baseline approaches up to 67.0% (at 14:15).

Figure 9A:
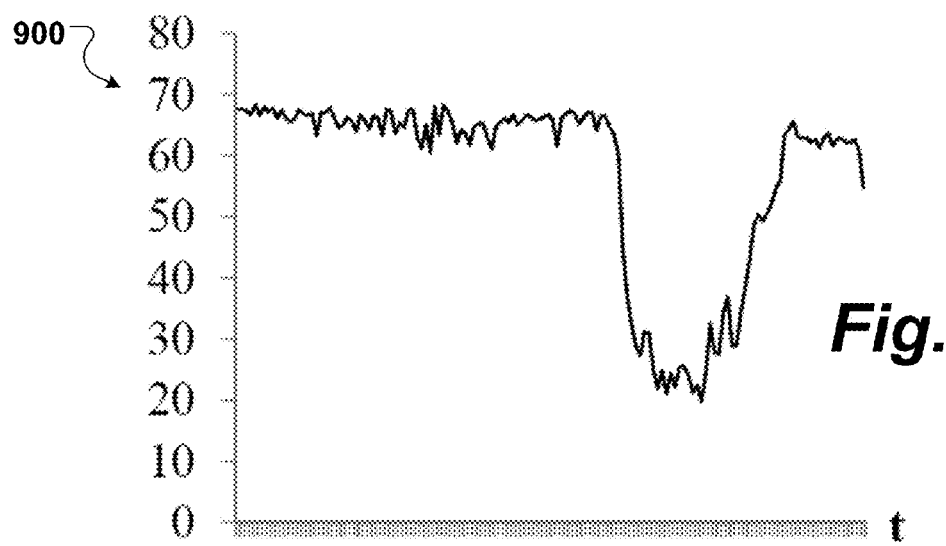
Figure 9B:
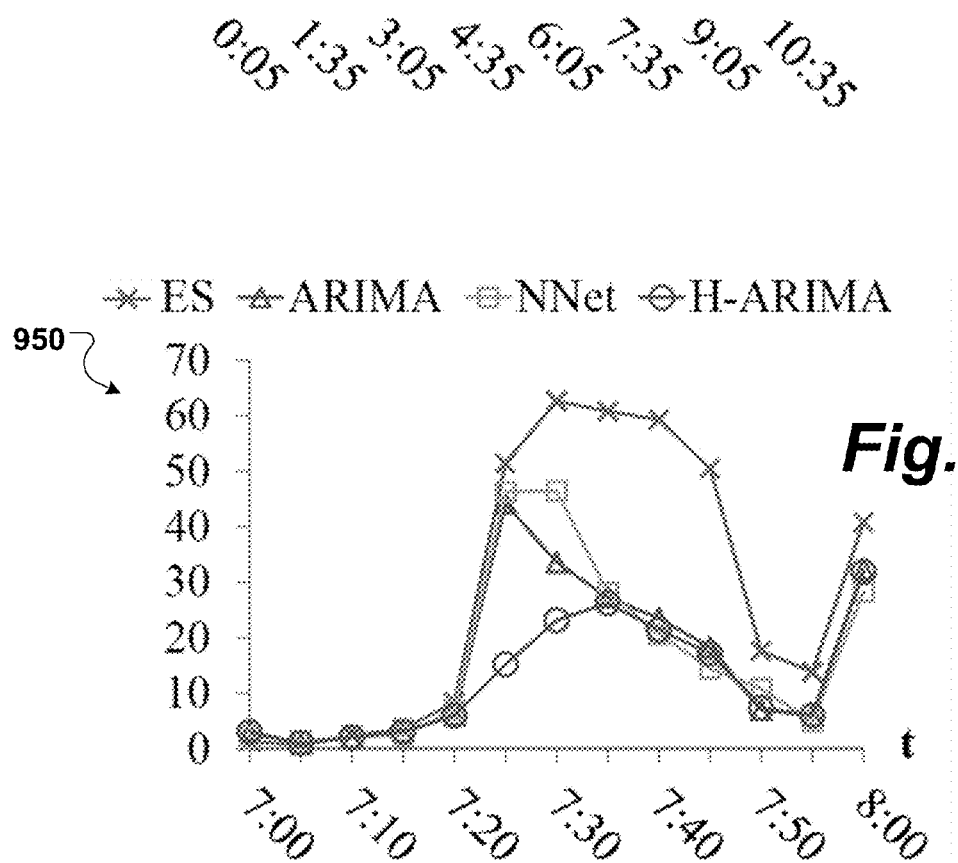

Similarly, as shown in plots 900 and 950 in FIGS. 9A and 9B, the morning rush hour of 1-10 starts around 7:00 am, and H-ARIMA outperforms baseline approaches up to 61% (at 7:25 am). We note that this set of experiments focuses on one-step forecasting where the baseline approaches can adjust themselves by utilizing the decreased speed, thereby their prediction accuracy recovers shortly.

Figure 10A:
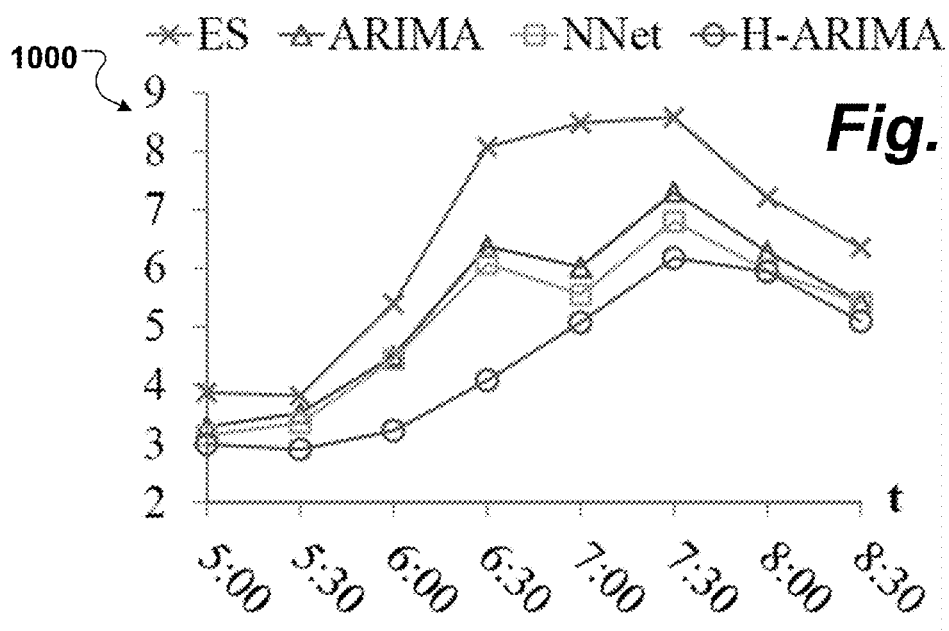
FIGS. 10A and 10B show root mean square error in miles per hour (mph) predictions for a rush hour time interval and a non-rush hour time interval, respectively.
Figure 10B:
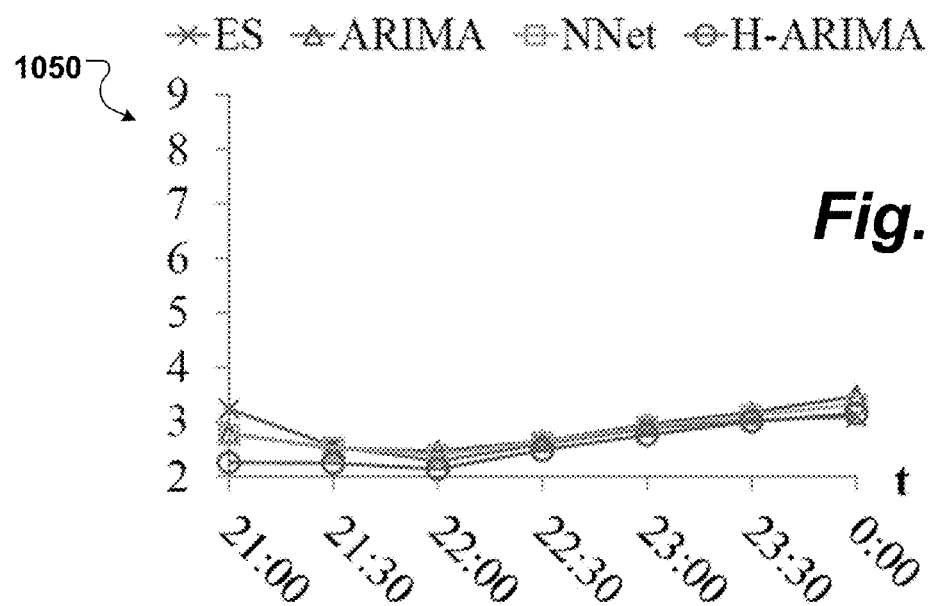

In long-term prediction experiments, we compare the prediction accuracy of H-ARIMA with baseline approaches for h>1. FIGS. 10A and 10B plot at 1000 and 1050 the average six-step (i.e., h=6) prediction accuracy over all sensors on a same weekday, for a rush hour time interval and a non-rush hour time interval, respectively. FIG. 10A shows that when prediction horizon increases, the prediction errors of baseline approaches increase, especially during rush hours. In FIG. 10A, we observe that H-ARIMA yields better prediction accuracy than that of baseline approaches. Similar to one-step prediction, in the next set of experiment we present the performance of H-ARIMA based on a road segment with rush hour congestion.

Figure 11A:
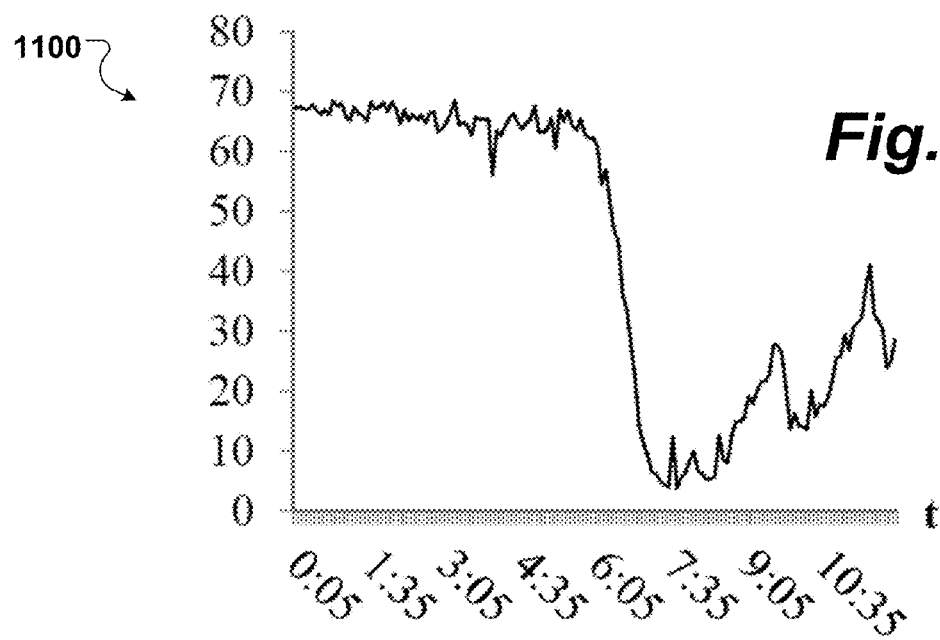
FIGS. 11A and 11B show the actual speed and mean absolute percent error, respectively, of predictions on road segments of 1-10.
Figure 11B:
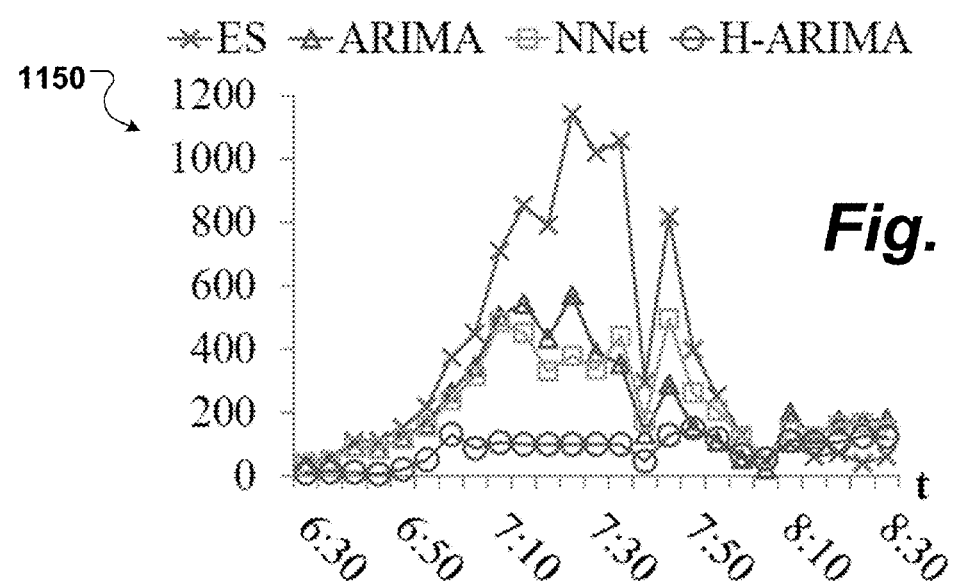

FIGS. 11A and 11B show the actual speed and MAPE, respectively, of the prediction on road segments of 1-10. As shown in plot 1100 in FIG. 11A, around 7:00 am, the speed decreases from 65 mph to 5 mph within a very short time. The baseline approaches can only sense this change with 30 minutes delay, and hence their MAPE is considerably high (see plot 1150 in FIG. 11B). On the other hand, H-ARIMA utilizes the historical congestion information to predict the traffic and hence its MAPE is fairly low as compared to baseline approaches. In particular, H-ARIMA improves the best baseline approach 78% (at 7:10 am).

Predictions can also be made with event information. In this set of experiments, we evaluate the prediction accuracy of our proposed approach in the case of events, dubbed H-ARIMA+ (discussed in further detail above). We compare H-ARIMA+ with H-ARIMA, and the best baseline approach in multi-step prediction (i.e., NNet). We set the prediction horizon of all approaches to 6, which indicates that our algorithm is set to predict speed information 30-minute in advance.

Figure 12A:
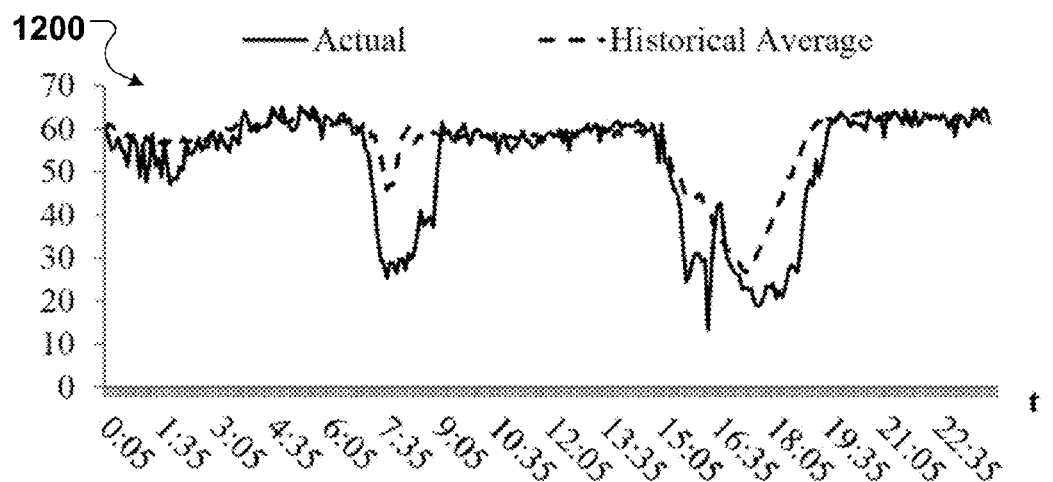
FIGS. 12A and 12B show data and predictions for a sample sensor located on east bound of CA-91 affected by three traffic collision events on Dec. 7, 2011.
Figure 12B:
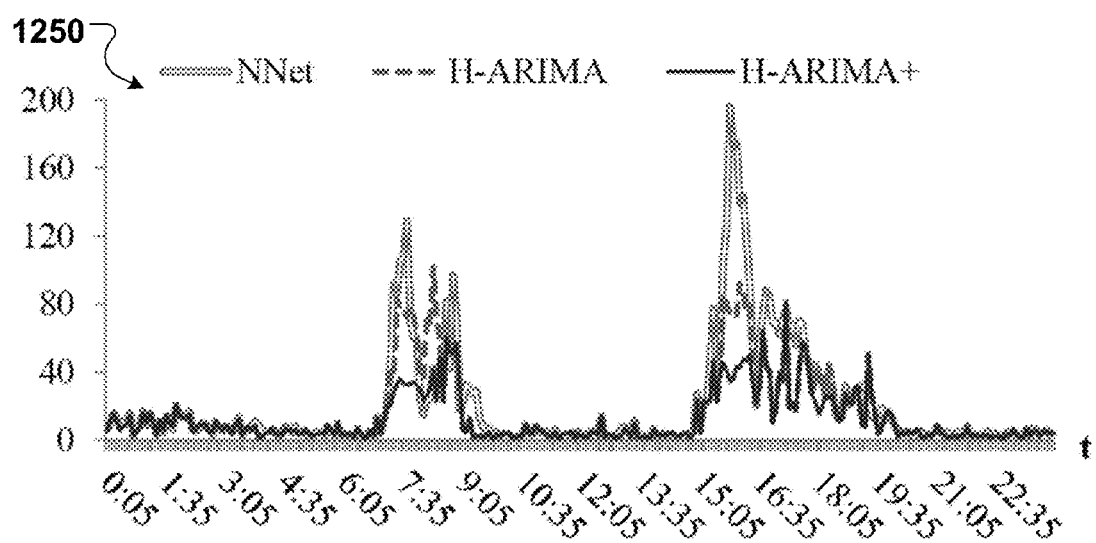

FIGS. 12A and 12B show the result for a sample sensor located on east bound of CA-91 affected by three traffic collision events on Dec. 7, 2011. FIG. 12A illustrates at 1200 the actual speed on that day and the historical average (for that weekday) of the selected sensor. The historical average indicates that the rush hour intervals for this sensor are 7:00 am to 8:00 am, and 3:00 pm to 7:00 pm. FIG. 12B plots 1250 the prediction error for H-ARIMA+, H-ARIMA, and NNet. Table III below shows the relevant attributes for each event, where Dist(e, s) refers to the distance between the sensor and corresponding event location. The number of affected lanes equals zero indicates that no lanes are blocked as the involved vehicles moved to the shoulder of the road after the accident.

As shown in FIG. 12A at 1200, the first two events (i.e., Event 350 and Event 2116) happened at the beginning of morning and afternoon rush hours, and the last event (i.e., Event 2621) happened near the end of the afternoon rush hour. As illustrated in FIG. 12B at 1250, the prediction accuracy of H-ARIMA+ improves the prediction accuracy of H-ARIMA, NNet by up to 45% and 67%, respectively. We observe that though H-ARIMA can capture the sudden speed changes at rush hours, it cannot predict traffic in case of events. This is because the effect of traffic events are smoothed in historical averages.

TABLE III

RELEVANT EVENT ATTRIBUTES

| Event ID | Start Time | No. of Affected Lanes | Dist(e, s) |
|---|---|---|---|
| 350 | 06:31 | 0 | 0.58 |
| 2116 | 16:06 | 0 | 0.10 |
| 2621 | 18:26 | 0 | 0.11 |

Figure 13A:
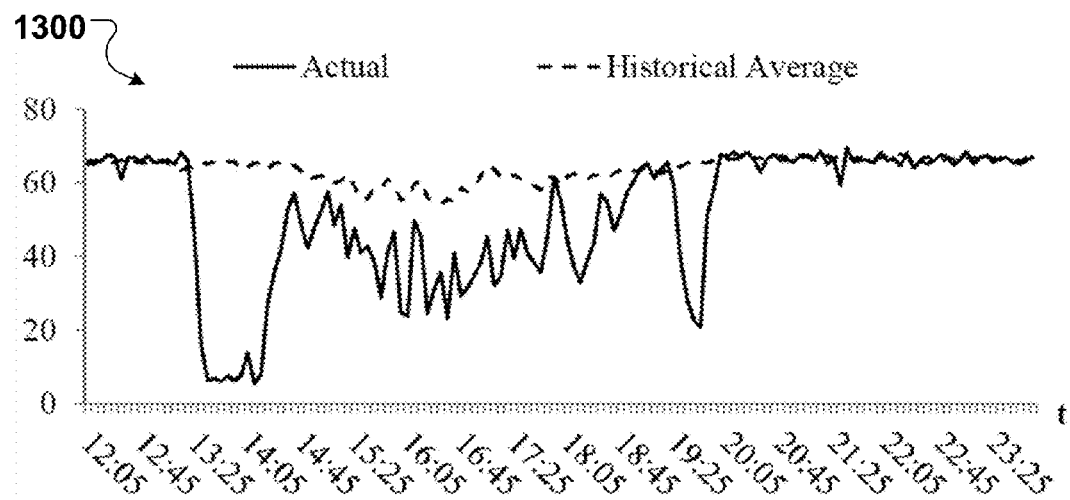
FIGS. 13A and 13B show data and predictions for a 6-hour long road construction event which happened in 1-405.
Figure 13B:
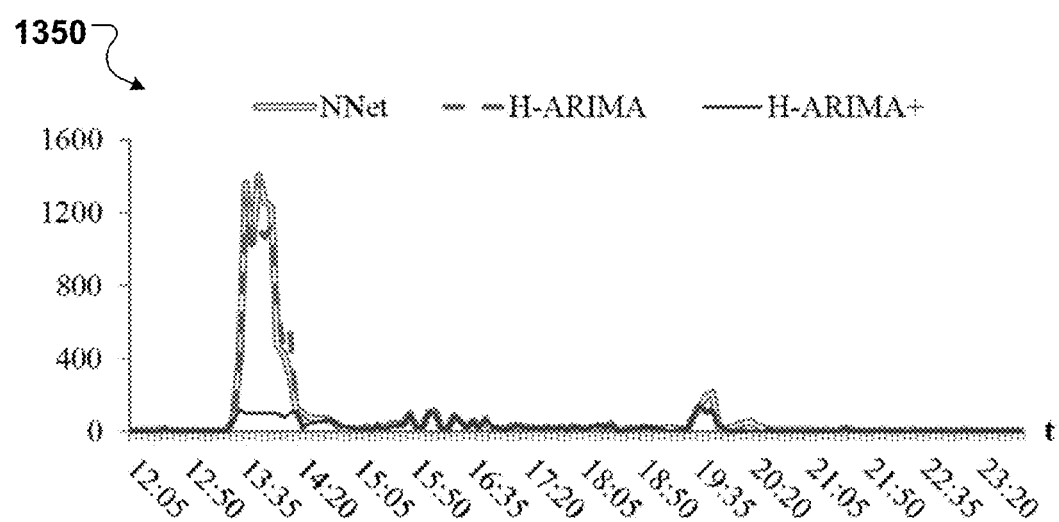

We also studied the effect of road construction events on our prediction model. FIGS. 13A and 13B show the effect of a 6-hour long road construction event which happened in 1-405 on a specific sensor. There is one lane affected by this event and the distance between this event and the selected sensor is 0.23 mile. As shown in FIG. 13A at 1300, the traffic speed deviates sharply, especially in the first hour of the event. Similar to traffic collision events, since ARIMA cannot handle sudden speed changes, and HAM cannot react to traffic dynamics such as events, the prediction accuracy of H-ARIMA (which selects between ARIMA and HAM) is very low at the beginning half an hour. However, H-ARIMA+ utilizes the event information, and yields significantly better prediction at the beginning of this event by improving H-ARIMA and NNet by up to 91% (see FIG. 13B at 1350).

A summary of findings is shown in Table IV below. We measured the overall precision of predictions on all sensors aggregated through all time stamps in terms of RMSE. As shown, H-ARIMA outperforms the baseline approaches in both prediction horizons. Moreover, when h=6, H-ARIMA+ improves the prediction accuracy of H-ARIMA by incorporating event information.

TABLE IV

RMSE OF ALL SENSOR PREDICTION ON WEEKDAYS

| | ES | ARIMA | NNet | H-ARIMA | H-ARIMA+ |
|---|---|---|---|---|---|
| h = 1 | 3.389 | 3.235 | 3.315 | 3.208 | N/A |
| h = 6 | 5.518 | 4.545 | 4.154 | 4.079 | 3.937 |

Further improvements may also be realized by using mobile sensors, such as public transit GPS data. In addition to using fixed sensors on road networks for traffic prediction, the approach described herein can be extended to predict traffic from the GPS data collected from mobile sensors (e.g., cell phones, in-car navigation devices, etc.). In this study, we focus on predicting High Occupancy Vehicle (HOV), a.k.a. carpool lane speed from public transit vehicle (e.g., Bus) GPS data. To achieve this goal, we propose an approach that transforms GPS data to fixed sensor data for prediction purpose. This approach has four main components:

1. Map-Matching: We map the raw GPS data on to the road network using map-matching techniques. Any state-of-the-art map-matching algorithms, such as described in Jing Yuan et al., "An Interactive-Voting based Map Matching Algorithm", can be applied here.
2. Route Generation: Since the public transits vehicles follow predefined routes, based on their mapped road segments, we can generate the routes as a set of connected road segments.
   Bus Speed Calculation: Given two consecutive GPS data from the bus we compute the bus speed as follows.

$$v_r = \frac{dist(l_i, l_{i+1})}{t_{i+1} - t_i}$$

where function "dist" calculates the route distance between two locations on a given route; $1_i$, and $I_{i+1}$ are the two adjacent GPS locations of; $t_i$ and $t_{i+1}$ are the corresponding time stamp of the GPS locations.

3. Calculation of Vehicle Speed on Road Segments: The last step calculates the speed for a single bus, this step focuses on generating the speed for a road segment, which is calculated as an aggregation of all bus speed values passing this road segment at a given time.

Figure 14:
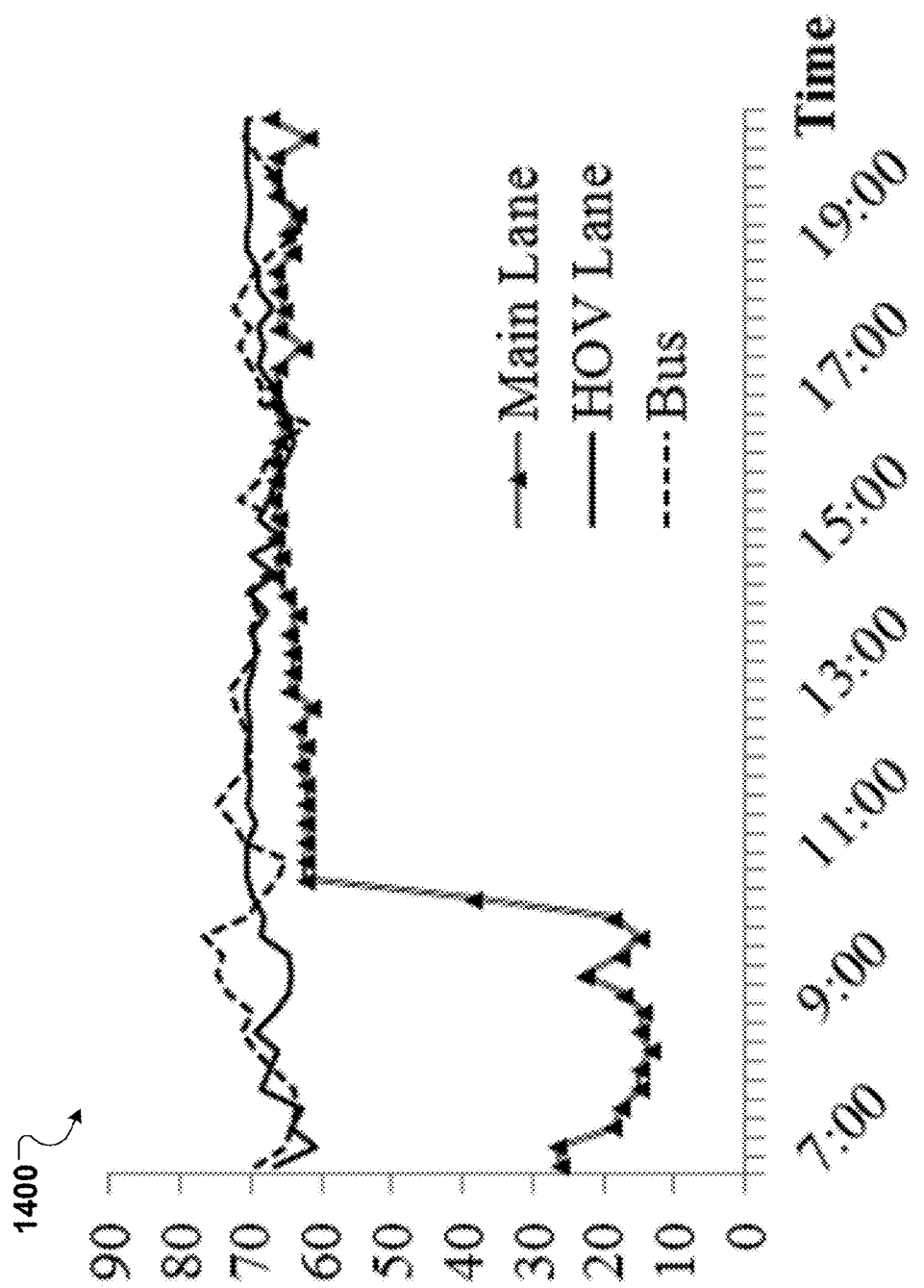
FIG. 14 shows a comparison of speed predictions generated by mobile sensors with speeds reported by static sensors for an HOV (High Occupancy Vehicle) lane.

To evaluate our approach, we conducted a case study on HOV lanes of 1-10 West freeway in city of Los Angeles. In this case study, we choose one road segment and compare the time varying speed values generated by our approach to the speed value reported by the fixed sensors located on the corresponding road segment. There are two speed values reported by the fixed sensors: main lane speed and HOV lane speed. As shown in FIG. 14 at 1400, the speed predicted by our approach from Bus GPS data is fairly close to the speed of the HOV lane reported by static sensors. As shown, our approach can be used for speed prediction of HOV lanes utilizing Bus GPS data. This is particularly useful for the road segments where static sensor data is not available.

In this paper, we studied a traffic prediction technique that uses real-world spatiotemporal traffic sensor data on road networks. We show that the traditional prediction approaches that treat traffic data streams as generic time-series fail to forecast traffic during traffic peak hours and in the case of events such as accidents and road constructions. Our algorithm can significantly improve the prediction accuracy of existing approaches by incorporating the historical traffic data into the prediction model as well as correlating the event attributes with traffic congestion. In this paper, we studied the prediction problem for each sensor individually.

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown only for the purpose of clarity in this description. No particular order may be required for these operations to achieve desirable results, and various operations can occur simultaneously or at least concurrently. In certain implementations, multitasking and parallel processing may be preferable.

The various implementations described above have been presented by way of example only, and not limitation. Thus, the principles, elements and features described may be employed in varied and numerous implementations, and various modifications may be made to the described embodiments without departing from the spirit and scope of the invention. Accordingly, other embodiments may be within the scope of the following claims.

What is claimed is:

1. A method comprising:
receiving, by one or more computers, a request relating to traffic prediction, the request having an associated day and an associated time;
comparing, by the one or more computers, a first prediction error for a first traffic prediction model with a second prediction error for a second traffic prediction model, wherein the first traffic prediction model comprises a moving average model that exhibits increased prediction accuracy as a prediction time horizon is reduced, the second traffic prediction model comprises a historical average model that exhibits similar prediction accuracy across multiple prediction time horizons, and both the first prediction error and the second prediction error are calculated using a historical data set selected from previously recorded traffic data in accordance with the associated day and the associated time;
selecting, by the one or more computers, use of the first traffic prediction model when the first prediction error is less than the second prediction error for the associated day and the associated time;
selecting, by the one or more computers, use of the second traffic prediction model when the first prediction error is not less than the second prediction error for the associated day and the associated time; and
providing an output for use in traffic prediction by the one or more computers, wherein the output comes from applying the first traffic prediction model when the first prediction error is less than the second prediction error, and the output comes from applying the second traffic prediction model when the first prediction error is not less than the second prediction error.

2. The method of claim 1, wherein the associated day and the associated time are based on a time and time horizon associated with the request.

3. The method of claim 1, wherein the historical data set is selected from the previously recorded traffic data by identifying a subset of the previously recorded traffic data that exhibits similar traffic conditions on a specific day of week, month or season that matches the associated day for the request.

4. The method of claim 1, comprising:
receiving information regarding an event that has one or more attributes that are correlated with reduction in traffic flow on one or more roads of a road network approaching the event;
calculating an influenced speed change and an influenced time shift, for a sensor associated with the road network, based on the information regarding the event; and
using the influenced speed change and the influenced time shift in application of the first traffic prediction model.

5. The method of claim 4, wherein calculating the influenced speed change and the influenced time shift comprises calculating based on attributes for the event comprising (i) start time, (ii) location, (iii) direction, (iv) event type, and (v) affected lanes.

6. The method of claim 1, wherein the previously recorded traffic data comprises data derived from mobile sensor data.

7. The method of claim 6, comprising generating the derived data by performing operations comprising:
calculating speeds for multiple mobile sensors from mobile sensor data with respect to connected road segments in a road network; and
generating a speed for a road segment of the connected road segments by calculating an aggregation of all speeds calculated for mobile sensors passing the road segment at a given time.

8. The method of claim 7, wherein the mobile sensor data is obtained from public transit vehicles.

9. A system comprising:
a user interface device; and
one or more computers operable to interact with the user interface device, the one or more computers comprising at least one processor and at least one memory device, and the one or more computers configured and arranged to perform operations comprising (i) receiving a request relating to traffic prediction, the request having an associated day and an associated time, (ii) determining how much to apply each of a first traffic prediction model and a second traffic prediction model based on previously recorded traffic data corresponding to the associated day and the associated time, wherein the first traffic prediction model comprises a moving average model that exhibits increased prediction accuracy as a prediction time horizon is reduced, and the second traffic prediction model comprises a historical average model that exhibits similar prediction accuracy across multiple prediction time horizons, and (iii) applying the first and second traffic prediction models in accordance with the determining to generate an output for use in relation to traffic prediction by the one or more computers;
wherein the one or more computers are configured and arranged to perform operations comprising (i) receiving information regarding an event that has one or more attributes that are correlated with reduction in traffic flow on one or more roads of a road network approaching the event, (ii) calculating an influenced speed change and an influenced time shift, for a sensor associated with the road network, based on the information regarding the event including start time, location, direction, and severity of the event as compared with similar historical events, and (iii) using the influenced speed change and the influenced time shift in application of the first traffic prediction model.

10. The system of claim 9, wherein the one or more computers comprise a server operable to interact with the user interface device through a data communication network, and the user interface device is operable to interact with the server as a client.

11. The system of claim 10, wherein the user interface device comprises a mobile phone.

12. The system of claim 9, wherein the one or more computers comprises one personal computer, and the personal computer comprises the user interface device.

13. A system comprising:
a user interface device; and
one or more computers operable to interact with the user interface device, the one or more computers comprising at least one processor and at least one memory device, and the one or more computers configured and arranged to (i) receive a request relating to traffic prediction, the request having an associated day and an associated time, (ii) compare a first prediction error for a first traffic prediction model with a second prediction error for a second traffic prediction model, wherein the first traffic prediction model comprises a moving average model that exhibits increased prediction accuracy as a prediction time horizon is reduced, the second traffic prediction model comprises a historical average model that exhibits similar prediction accuracy across multiple prediction time horizons, and both the first prediction error and the second prediction error are calculated using a historical data set selected from previously recorded traffic data in accordance with the associated day and the associated time, (iii) select use of the first traffic prediction model when the first prediction error is less than the second prediction error for the associated day and the associated time, (iv) select use of the second traffic prediction model when the first prediction error is not less than the second prediction error for the associated day and the associated time, and (v) provide an output for use in traffic prediction by the one or more computers, wherein the output comes from applying the first traffic prediction model when the first prediction error is less than the second prediction error, and the output comes from applying the second traffic prediction model when the first prediction error is not less than the second prediction error.

14. The system of claim 13, wherein the associated day and the associated time are based on a time and time horizon associated with the request.

15. The system of claim 13, wherein the historical data set is selected from the previously recorded traffic data by identifying a subset of the previously recorded traffic data that exhibits similar traffic conditions on a specific day of week, month or season that matches the associated day for the request.

16. The system of claim 13, wherein the one or more computers are configured and arranged to receive information regarding an event that has one or more attributes that are correlated with reduction in traffic flow on one or more roads of a road network approaching the event, calculate an influenced speed change and an influenced time shift, for a sensor associated with the road network, based on the information regarding the event, and use the influenced speed change and the influenced time shift in application of the first traffic prediction model.

17. The system of claim 16, wherein the one or more computers are configured and arranged to calculate the influenced speed change and the influenced time shift based on attributes for the event comprising (i) start time, (ii) location, (iii) direction, (iv) event type, and (v) affected lanes.

18. The system of claim 13, wherein the previously recorded traffic data comprises data derived from mobile sensor data.

19. The system of claim 18, wherein the one or more computers are configured and arranged to generate the derived data, the one or more computers being configured and arranged to calculate speeds for multiple mobile sensors from mobile sensor data with respect to connected road segments in a road network, and generate a speed for a road segment of the connected road segments by calculating an aggregation of all speeds calculated for mobile sensors passing the road segment at a given time.

20. The system of claim 19, wherein the mobile sensor data is obtained from public transit vehicles.

* * * * *